Figure 1:
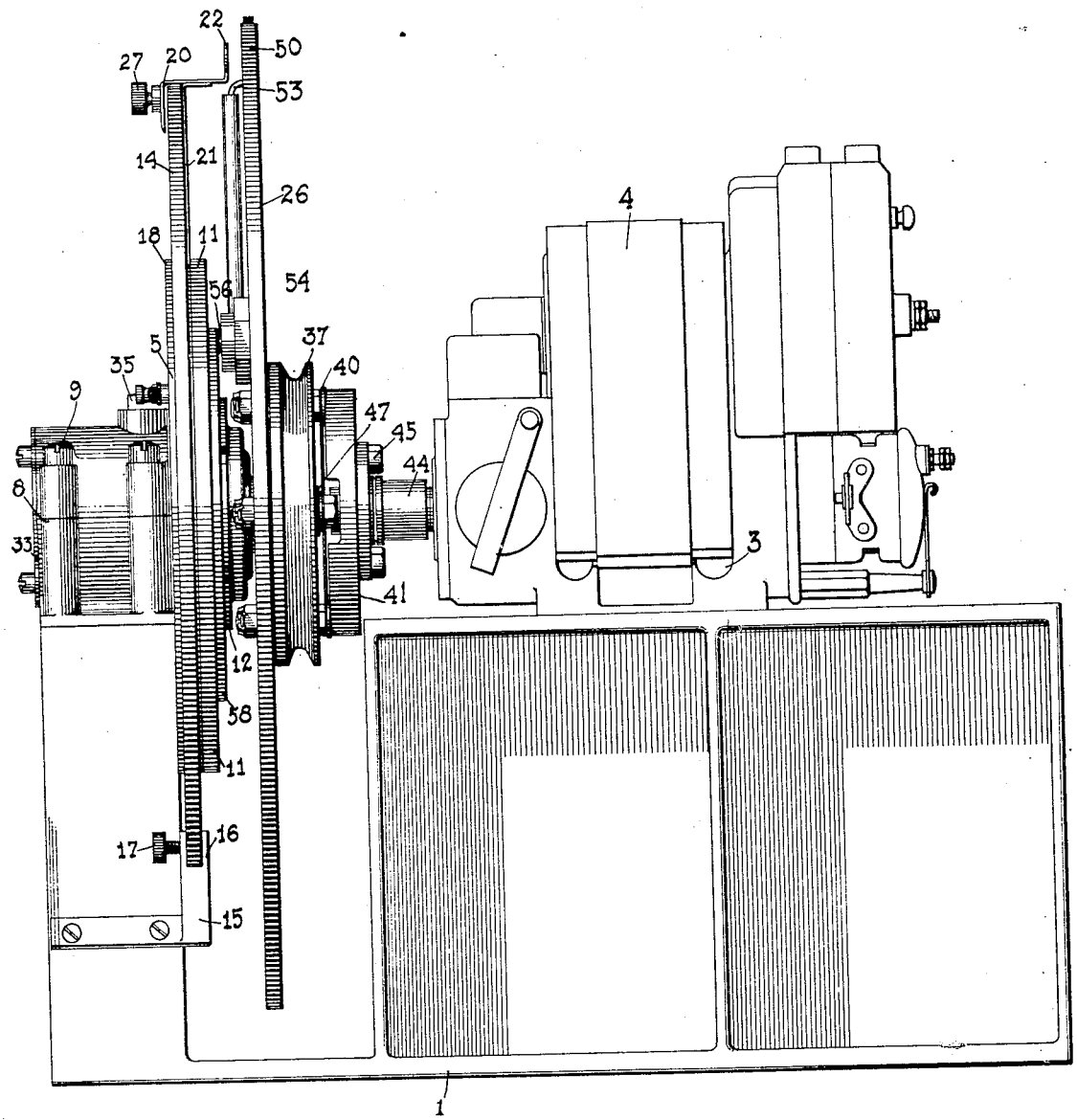

T. S. KEMBLE.
MAGNETO TESTING APPARATUS.
APPLICATION FILED SEPT. 16, 1918.

1,316,244.

Patented Sept. 16, 1919.
3 SHEETS—SHEET 2.

Inventor
THOMAS S. KEMBLE
By his Attorney

T. S. KEMBLE.
MAGNETO TESTING APPARATUS.
APPLICATION FILED SEPT. 16, 1918.

1,316,244.

Patented Sept. 16, 1919.
3 SHEETS—SHEET 3.

Inventor
THOMAS S. KEMBLE.
By his Attorney ic
UNITED STATES PATENT OFFICE.

THOMAS SETH KEMBLE, OF BUFFALO, NEW YORK, ASSIGNOR TO CURTISS AEROPLANE AND MOTOR CORPORATION, A CORPORATION OF NEW YORK.

MAGNETO-TESTING APPARATUS.

1,316,244.   Specification of Letters Patent.   Patented Sept. 16, 1919.

Application filed September 16, 1918. Serial No. 254,254.

*To all whom it may concern:*

Be it known that I, THOMAS S. KEMBLE, a citizen of the United States, residing at Buffalo, in the county of Erie and State of New York, have invented certain new and useful Improvements in Magneto-Testing Apparatus, of which the following is a specification.

This invention relates to an apparatus for testing the generator or other ignition supply unit used in ignition systems for internal combustion engines and particularly for testing magnetos which are designed for and generally used with modern multi cylinder engines.

It often happens that inaccuracies occur in the manufacture and assembly of magnetos adapted to the ignition of multi-cylinder internal combustion engines and such inaccuracies and imperfections in manufacture often result in considerable variance in the time intervals between successive sparks produced. The imperfection in assembly is so pronounced on occasions that an extra spark is produced at a point intermediate the true and correct sparking points. Such irregular timing of the igniting sparks in the successive cylinders may cause either pre-ignition or late ignition and results in inefficient and irregular operation of the engine. The object of this invention is the provision of a method and means for testing a magneto prior to its installation on the engine to determine the existence or non-existence of any such differences in the time intervals occurring between the successive sparks, and to this end I have devised a novel machine or apparatus to which the magneto may be coupled and driven at its operating speed under conditions approximating service conditions and the required test made to determine and compare the time intervals occurring between the successive igniting sparks. Specifically this novel and improved machine consists of a stationary disk whose periphery is laid off by means of angular graduations into degrees and seconds and a second disk or equivalent member which is disposed in a position adjacent the stationary disk and adapted to be coupled to the magneto to rotate therewith. The rotating member carries a spark gap which is connected with the circuit of the magneto in such manner that a spark occurs at the rotating gap at time intervals corresponding to the periods between the explosions in successive cylinders of the engine and by observing the instant or position on the stationary disk at which the spark occurs the number of degrees or time intervals between successive sparks may be read on or determined from the graduations on the stationary disk. For assisting in determining the exact position on the graduated scale where the spark occurs an index finger is conveniently mounted on the stationary disk for adjustment therewith or independently thereof for setting at the various positions and for indicating to a nicety the time intervals.

Figure 2:
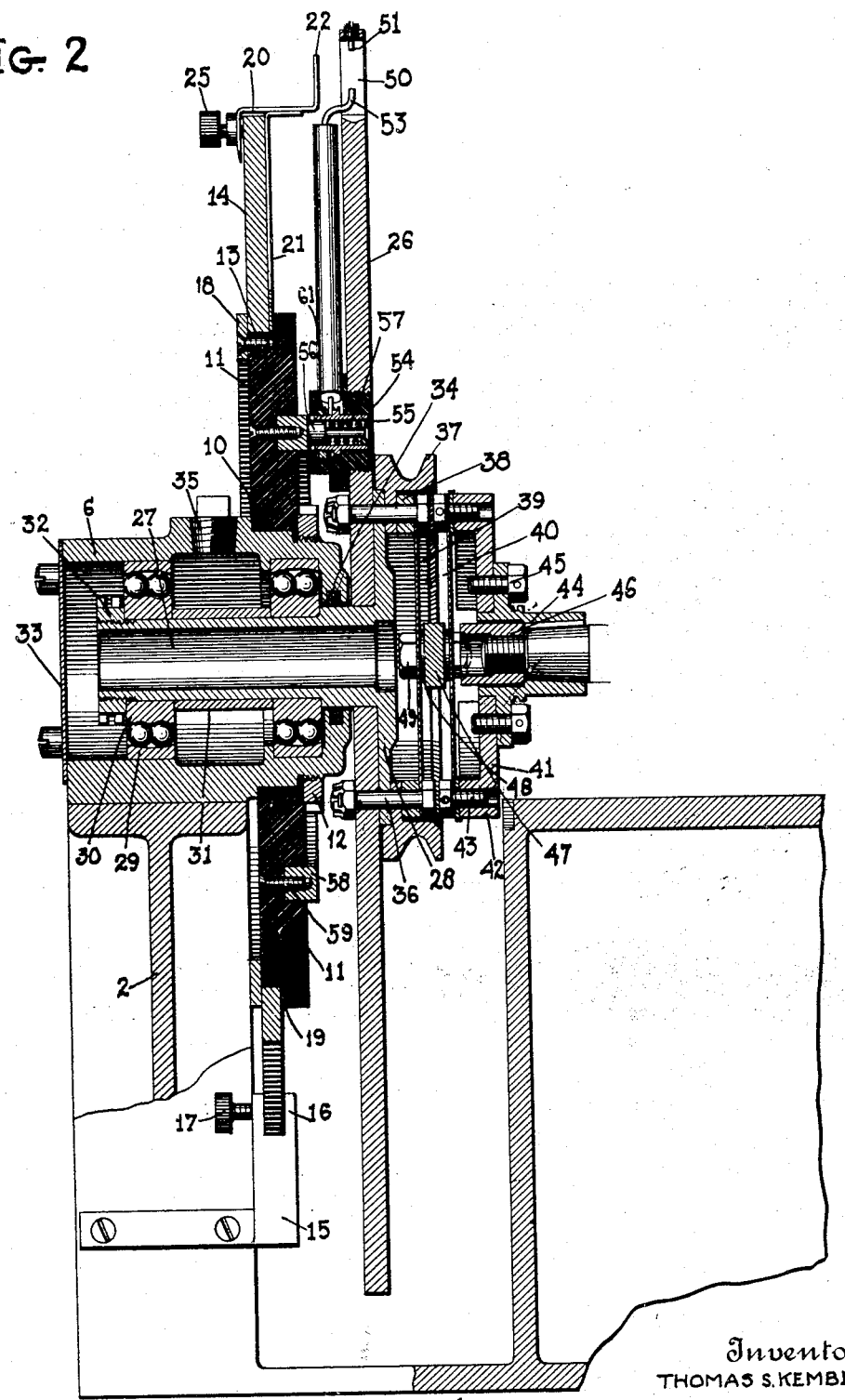
Figure 3:
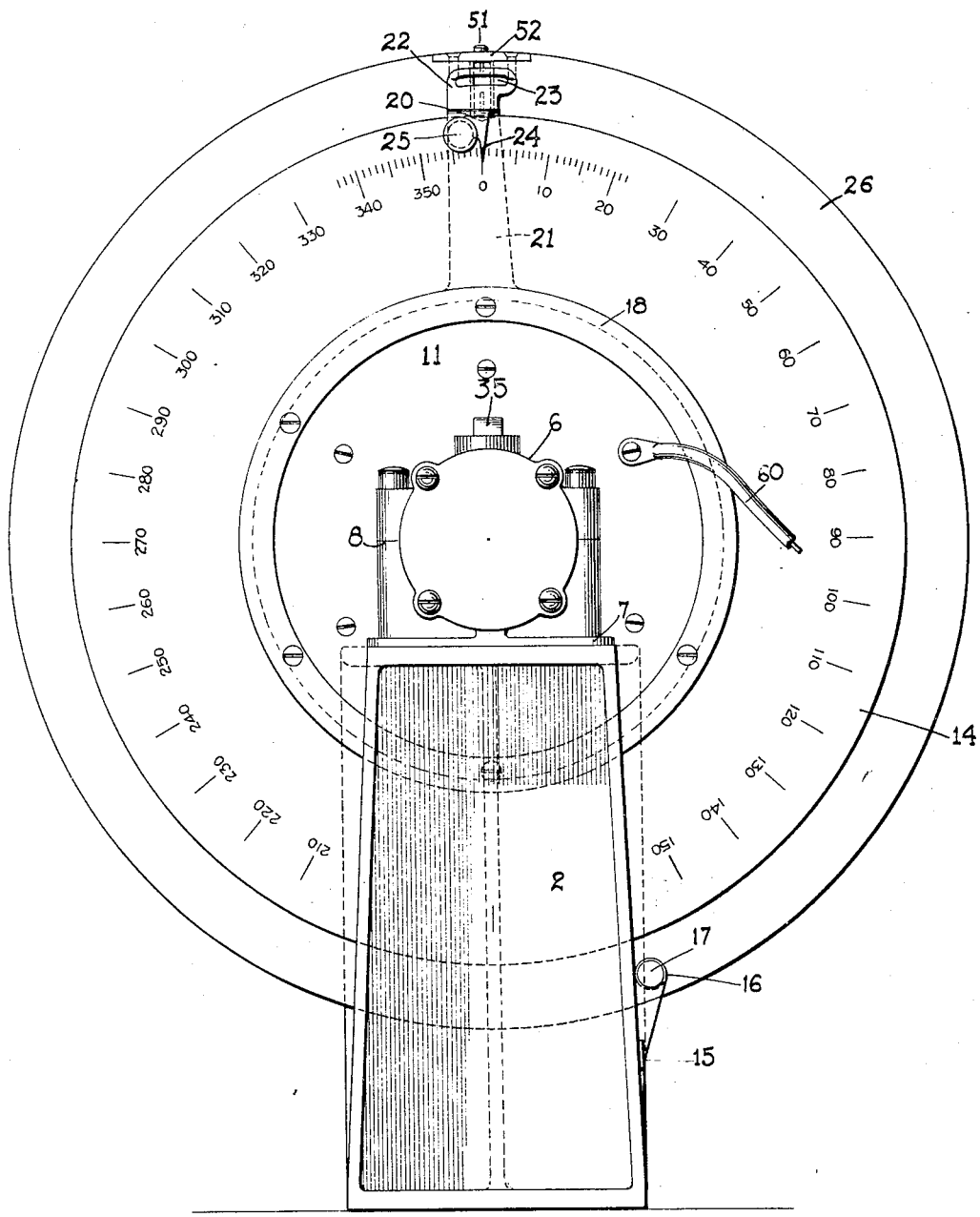

For a better understanding of the invention as above outlined and for other improved features of this apparatus reference may be had to the accompanying drawings which illustrate one embodiment of the many my improvements are capable of assuming, wherein;

Figure 1 is a side elevation of the apparatus in an assembled position for testing, Fig. 2 is a central sectional view therethrough, and Fig. 3 is a front view of the machine showing the graduated scale and the index finger in operative relation thereto.

Referring to the drawings wherein like numerals refer to similar parts throughout, my improved apparatus is mounted upon a base 1 having on the left end thereof a standard 2 preferably of I form and integrally formed therewith and on the right end thereof a table 3 also preferably integrally formed with the base 1 as by means of a single casting. A magneto 4 to be tested is adapted to be mounted upon this table 3 in operative relation to the testing machine denoted as a whole by the numeral 5 and mounted upon the standard 2 in alinement with the magneto 4. The standard 2 carries a cylindrical bearing housing unit 6. This bearing housing has a flat base 7 resting upon the upper end of the standard 2 and is split horizontally as indicated at 8 for convenience in assembly of the machine. The upper and lower halves of this housing 6 are secured together and anchored to the standard 2 by means of bolts 9 passing through bosses formed thereon and downwardly in engagement with the standard 2. Near the right hand end this housing 6 is provided with a shoulder 10 and adjacent to this shoulder there is provided a bearing surface preferably cylindrical for the reception of the base 11 of the stationary disk. This base is securely anchored in its position encircling the housing 6 by means of a tightening nut 12 which is screw-threadedly attached to the housing 6 as is indicated in the drawings. The base 11 of the stationary disk is provided on its exterior with a race-way 13 for the reception of a member 14 which carries the graduated scale illustrated in Fig. 3. This member 14 is in the form of an angular ring and is adjustable around the cylindrical race-way 13 and base 11 for the purpose of accurately setting the scale in any desired position. For anchoring the member 14 in the adjusted position I have provided a member 15 which is attached to the side of the standard 2 by means of the screw bolts as indicated and this member is provided on its upper end with a pair of forks 16 for the reception of the periphery of the graduated ring. A thumb set-screw 17 is screw-threadedly attached to one of these forks 16 and may be screwed home to engage the ring 14 and thereby securely hold the same in the adjusted position. A clamping ring 18 is attached as by means of the screw bolts indicated, to one side of the base 11 and near the periphery thereof to form one side of the race-way 13 around which the ring 14 may be turned as a bearing. On the opposite side of the member 14 from the ring 18 there is disposed also within the race-way 13 a ring 19 for carrying in an adjustable manner an indicating pointer 20, this pointer being carried by means of an integrally formed upwardly extending tongue 21. This tongue preferably forms a part of the ring 19. The tongue 21 extends upwardly to the periphery of the ring 14 and is there bent at right angles to extend in a horizontal direction, and upon this horizontal portion of the tongue or support 21 the indicator which is indicated as a whole by the numeral 20 rests and is brazed thereto. The indicator is preferably formed from a single piece of sheet metal and comprises an upright portion 22 which is provided with an elongated slot 23 through which may be observed, as will hereinafter appear, the sparks occurring between the spark terminals. This indicator is also provided with a pointer 24 which traverses the graduations on the ring 14 for determining the exact relative position of the pointer on the graduated scale. For accurately and securely anchoring this indicator in any one position there is provided a thumb set screw 25 which passes transversely through a screw-threaded opening and an enlarged part of the indicator adjacent the pointer 24 and engages the ring 14 just above the graduations to clamp the pointer thereto.

The rotary disk is indicated generally by the numeral 26 and is provided with a central opening for the reception of a hollow shaft 27 having an integral flange 28 to which the disk 26 may be securely fixed for rotation with the shaft 27. This hollow shaft 27 extends into the cylindrical bearing housing 6 and is rotatively mounted therein by means of ball bearings disposed between race-rings 29 and 30 as indicated, the outer race-ring 29 engaging the interior of the housing 6 and the inner race-ring 30 engaging the periphery of the hollow shaft 27. There are two sets of these bearings which are spaced apart by means of a spacing ring 31, the inner set being held in position by engagement with the right hand end of the ring 31 and a shoulder provided on the shaft 27 for this purpose and the outer set of these bearings being held in a position abutting the spacing ring 31 by means of the clamping nut 32 screw-threadedly engaging the outer end of the shaft. The housing 6 is provided on its outer end with a cover 33 attached thereto as indicated by screw bolts, for closing the interior of the housing and preventing the escape of oil contained therein. The inner end of the housing 6 is provided with an inwardly extending angular flange closely encircling the inner end of the shaft 27 and around the periphery is disposed a packing ring 34 which engages the shaft 27 for the purpose of preventing the escape or creepage of oil from the interior of the housing 6. The housing is provided with a plug and inlet 35 for the admission of a suitable lubricant. The ring 26 is driven from the shaft 27 and the flange 28 by means of a pair of bolts 36 passing transversely therethrough. These bolts also pass transversely through an interiorly disposed flange on a suitable driving pulley 37, a spacing ring 38 and a coupling disk 39 whereby the disk 26, the flange 28, the driving pulley 37 and the coupling disk 39 are securely fastened together into a rigid structure. An opposed coupling disk 40 is illustrated for connection to the magneto shaft, this connection being accomplished by means of an annular member or ring 41 which is provided on its periphery with a securing portion or shoulder 42 for the reception of securing bolts 43 passing through openings formed in the coupling disk, suitable spacing washers being disposed between the disk 40 and the shoulder 42. The ring 41 encircles and is attached to the usual magneto coupling sleeve 44, the latter being keyed to the magneto shaft in the usual manner and having securing bolts 49 passing through the flange formed thereon and engaging the ring 41. A suitable nut 46 may be screwed on to the screw-threaded end of the magneto shaft for the purpose of maintaining the sleeve 44 in operative position. The two opposed disks 39 and 40 are connected together through the medium of the coupling cross bar 47, this cross bar 47 being disposed therebetween and suitably spaced therefrom as by the washers 48. The coupling is effected by means of clamping bolts 49 passing transversely through openings formed near the periphery of the two opposed clamping disks. This coupling arrangement forms a very satisfactory connection between the rotary disk 26 and the magneto shaft, these resilient coupling members 39 and 40 forming an axially yielding connection to compensate for any play between the two devices.

The ring 26 has formed on its periphery a radially extending slot 50 and in this slot the pair of spark terminals hereinbefore referred to are adapted to be disposed. One of these terminals 51 is carried by a cross piece or bridge 52 which is mounted within a recess milled out upon the periphery of the ring 26, this terminal 51 being screw-threadedly attached to its carrier 52 for the purpose of adjusting the spark gap. In the particular embodiment of the improvements herein set forth this terminal 51 forms the ground terminal which as is indicated has an electrical connection with the framework of the machine. The other terminal 53 which is disposed within the slot 50 and adjacent to the terminal 51, is in the form of a radially extending connection, electrical communication with the live side of the magneto being established through a sliding contact as indicated in the drawings. The terminal 53 leads downwardly to and is anchored within an insulating plug 54 which is rigidly and screw-threadedly attached in an opening formed in the ring 26 as indicated. This insulating plug 54 is provided with a horizontally disposed opening and within this opening there is contained a cylindrical sleeve or receptacle 55. Within said member 55 there is contained a sliding contact 56, a spring 57 engaging the bottom wall of the opening and the insulating plug 54 at one end and engaging the sliding contact 56 at the other end whereby the contact is urged in an outward direction by the spring at all times. This sliding and rotating contact member 56 is thereby maintained in engagement with a stationary annular member or ring 58 which is carried by the base 11, an annular groove being provided in the base 11 for the reception of this ring, by suitable screw bolts 59 passing transversely through the member 11 and securely clamping the ring 58 into operative position. Connection from the live wire or secondary of the magneto is formed by means of the lead 60 which as indicated in Fig. 3 is electrically connected with the ring 58 through the medium of one of the clamping bolts 59. The terminal 53 leads radially inwardly to the cylindrical member 55, passing radially through one side of the cylindrical plug 54, and is connected with the sleeve 55 by means of a clamping nut 61 which encircles and slips over the cylindrical sleeve 55 and is provided on its exterior with screw threads for engagement with similar threads on the interior of the insulating bushing or plug 54, this clamping nut 61 coöperating with a shoulder formed on the exterior of the sleeve 55 for clamping the inner end of the terminal 53 therebetween. It is understood that this terminal 53 has sufficient rigidity in this mounting to be retained in its operative position when the rotary disk 26 is driven during the test.

The operation of this testing machine will be readily understood from the above description. Assuming that the magneto has been mounted in an operative position in alinement with the shaft 27 as indicated in the drawings and that the live terminal of the magneto has been electrically connected with the contact ring 58 through the flexible connection 60, it is apparent that the terminal 53 or spark gap is maintained in electrical communication with the live terminal of the magneto through the medium of the sliding contact 56 during the rotation of the disk 56. The magneto and the rotary disk 26 are then driven from some exterior source of power by means of the driving pulley 37 and when operating at the proper speed sparks are caused to occur between the terminals 51 and 53 at regular intervals, which intervals may be accurately determined and measured by setting the pointer 24 at the exact point or points on the graduated scale where the spark occurs. By means of the particular indicator shown the spark may be observed through the elongated slot 23, and the pointer 24 may then be set to the exact position where the spark occurs upon the graduated scale. The various time intervals thus determined may be compared with each other and if a too wide variance is found to exist therebetween, steps may be taken to correct the inaccuracy of the firing or the magneto may be discarded for a new and satisfactory magneto.

In accordance with the requirements of the patent statute I have set forth one complete embodiment of my improvements but it is understood that these improvements are capable of assuming other forms than that illustrated and that the claims hereto annexed are to be considered as covering all such forms, except as is specifically recited therein, due regard being had to a consideration of the prior art.

What is claimed is:—

1. In an apparatus for testing igniting magneto machines, the combination of the magneto to be tested, a rotary spark gap adapted to be rotated with the magneto under test and having electrical communication with the magneto, and means whereby the magneto and the spark gap may be rotated for the purpose set forth.

2. In an apparatus for testing magneto machines, the combination of a magneto, a rotary spark gap adapted to be rotated therewith and an angularly adjustable indicator disposed adjacent said rotary spark gap for the purpose set forth.

3. In an apparatus for testing magneto machines the combination of the magneto, a spark gap adapted to be rotated therewith and a stationary indicating mechanism mounted adjacent said rotary spark gap for indicating the angular position of the sparks occurring at said spark gap.

4. In an apparatus for testing igniting magneto machines, the combination of a rotary spark gap adapted to be coupled for rotary movement with the magneto under test, means adjacent said rotating gap carrying an indicating pointer, and means for establishing electrical communication between the magneto and the rotary spark gap.

5. In an apparatus for testing igniting magneto machines, the combination of a rotary spark gap adapted to be driven in unison with the magneto, a stationary contact ring in electrical communication with said magneto, a sliding contact member rotatable with said spark gap and establishing electrical communication between said ring and said gap, and a member with a graduated scale thereon for indicating the angular positions where the sparks occur.

6. In an apparatus for testing magneto machines, the combination of a rotary member having driving means thereon and comprising a pair of opposed coupling disks for attachment to the magneto under test, said rotary member carrying an observable spark gap and means for establishing electrical communication between said spark gap and the magneto comprising a contact ring and a sliding contact for the purpose set forth.

7. In an apparatus for testing igniting magneto machines, the combination of a rotary disk carrying a spark gap, means for coupling said rotary disk to the magneto under test, means for establishing communication between said rotary spark gap and the magneto under test comprising a relatively movable sliding ring and a sliding contact, and means whereby said rotary disk may be driven in unison with the magneto under test.

8. In an apparatus for testing igniting magneto machines comprising a rotary disk having a spark gap adjacent its periphery, means establishing electrical communication between said spark gap and the magneto under test, a graduated scale and indicating means supported in juxtaposition to the path of the rotary spark gap, means for coupling said rotary disk to the magneto under test comprising a pair of opposed resilient disks and means whereby said rotary disk may be driven in unison with the magneto under test.

9. In an apparatus for testing igniting magneto machines comprising a rotary shaft and a cylindrical bearing housing therefor, a rotary disk carried by said shaft and having an observable spark gap mounted thereon, said spark gap being in electrical communication with the magneto under test, a graduated scale and indicating pointer supported adjacent the path of said rotary spark gap and carried by an insulating base, said insulating base being mounted upon said cylindrical bearing housing, means for coupling said rotary shaft and disk to the magneto under test and means whereby the shaft and disk may be rotated at the required operating speed.

10. In an apparatus for testing magnetos used in multicylinder engines, the combination of a supporting base adapted to carry the magneto to be tested, a rotary metallic disk carried by said base and driven with said magneto, said disk having a radial slot on the periphery thereof and carrying a ground contact extending into said slot, a stationary insulated disk carried by said base and mounted adjacent said rotary disk, said stationary disk carrying an angularly graduated scale upon its periphery, an indicating pointer adjustable along said graduated scale and carried opposite the rotary path of said ground terminal, a contact ring carried by said insulating disk and electrically connected with said magneto, a sliding contact carried by said rotary disk and insulated therefrom, said sliding connection being maintained in engagement with said contact ring, and a terminal connection leading radially outwardly from said sliding contact and coöperating with said ground contact within said slot for the purpose set forth.

In testimony whereof I hereunto affix signature.

THOMAS SETH KEMBLE.